United States Patent [19]

Kitagishi et al.

[11] Patent Number: 4,949,107
[45] Date of Patent: Aug. 14, 1990

[54] CAMERA HAVING TELESCOPIC CAPABILITY

[75] Inventors: Nozomu Kitagishi; Takeshi Koyama; Sadatoshi Takahashi, all of Tokyo; Kouji Oizumi, Kanagawa, all of Japan

[73] Assignee: Canon Kabushiki Kaisha, Tokyo, Japan

[21] Appl. No.: 393,774

[22] Filed: Aug. 15, 1989

[30] Foreign Application Priority Data

Aug. 31, 1988 [JP] Japan .................. 63-218177
Aug. 31, 1988 [JP] Japan .................. 63-218181
Dec. 6, 1988 [JP] Japan .................. 63-308663

[51] Int. Cl.⁵ ............................................ G03B 17/48
[52] U.S. Cl. .................................. 354/79; 354/155
[58] Field of Search ............ 354/75, 76, 79, 155, 354/222

[56] References Cited

U.S. PATENT DOCUMENTS 2,882,791 4/1959 Möller et al. .................. 354/76 X
2,933,992 4/1960 Bushnell et al. .................. 354/79
4,067,027 1/1978 Yamazaki .......................... 354/79
4,195,924 4/1980 Stemme et al. .................. 354/222

Primary Examiner—Brian W. Brown
Attorney, Agent, or Firm—Fitzpatrick, Cella, Harper & Scinto

[57] ABSTRACT

A camera having a photographic lens and an eyepiece lens for observing an image formed by the photographic lens, wherein when this camera is used as a telescope, the interval between the image and the eyepiece lens is shortened, while simultaneously changing the focal length of the eyepiece lens, so that the magnification of the finder is increased.

9 Claims, 10 Drawing Sheets

F I G.3(A)
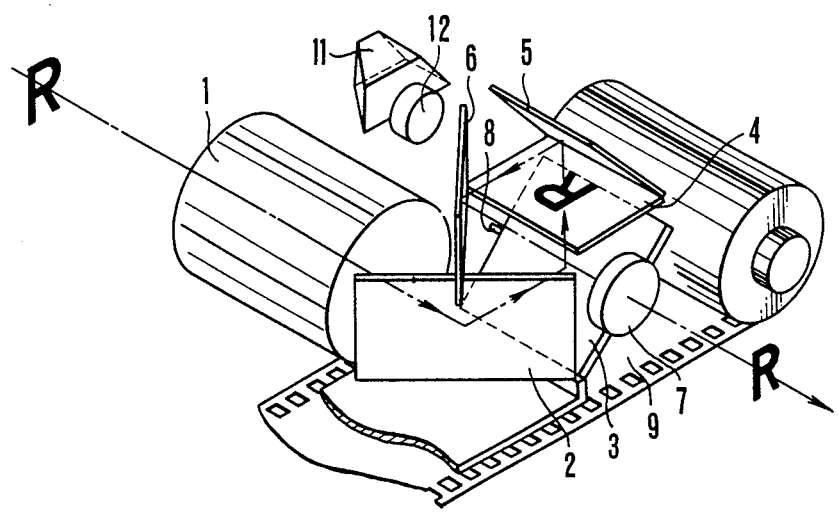
F I G.3(B)
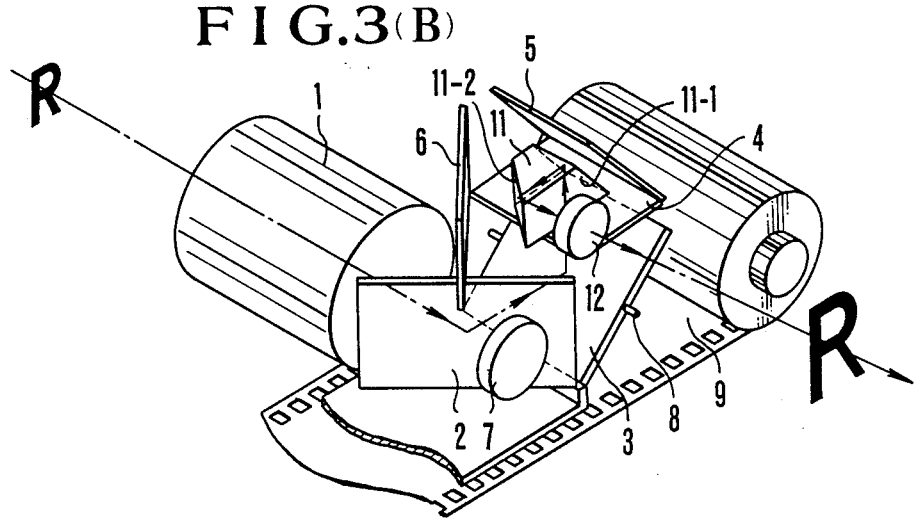

F I G.4(A)
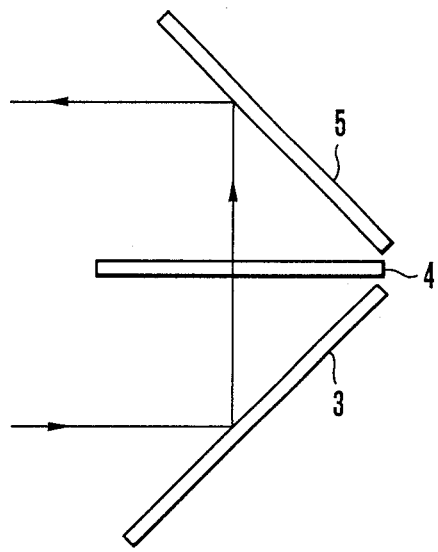
F I G.4(B)
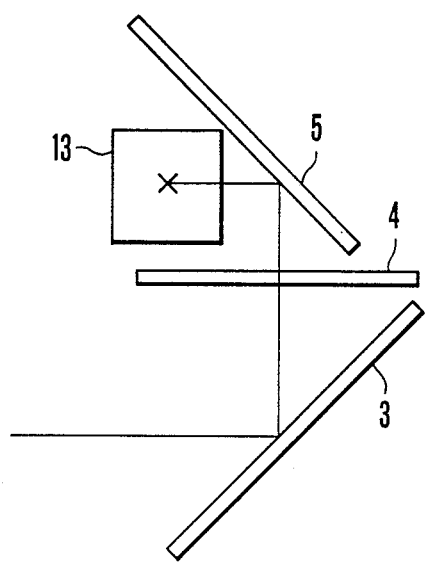

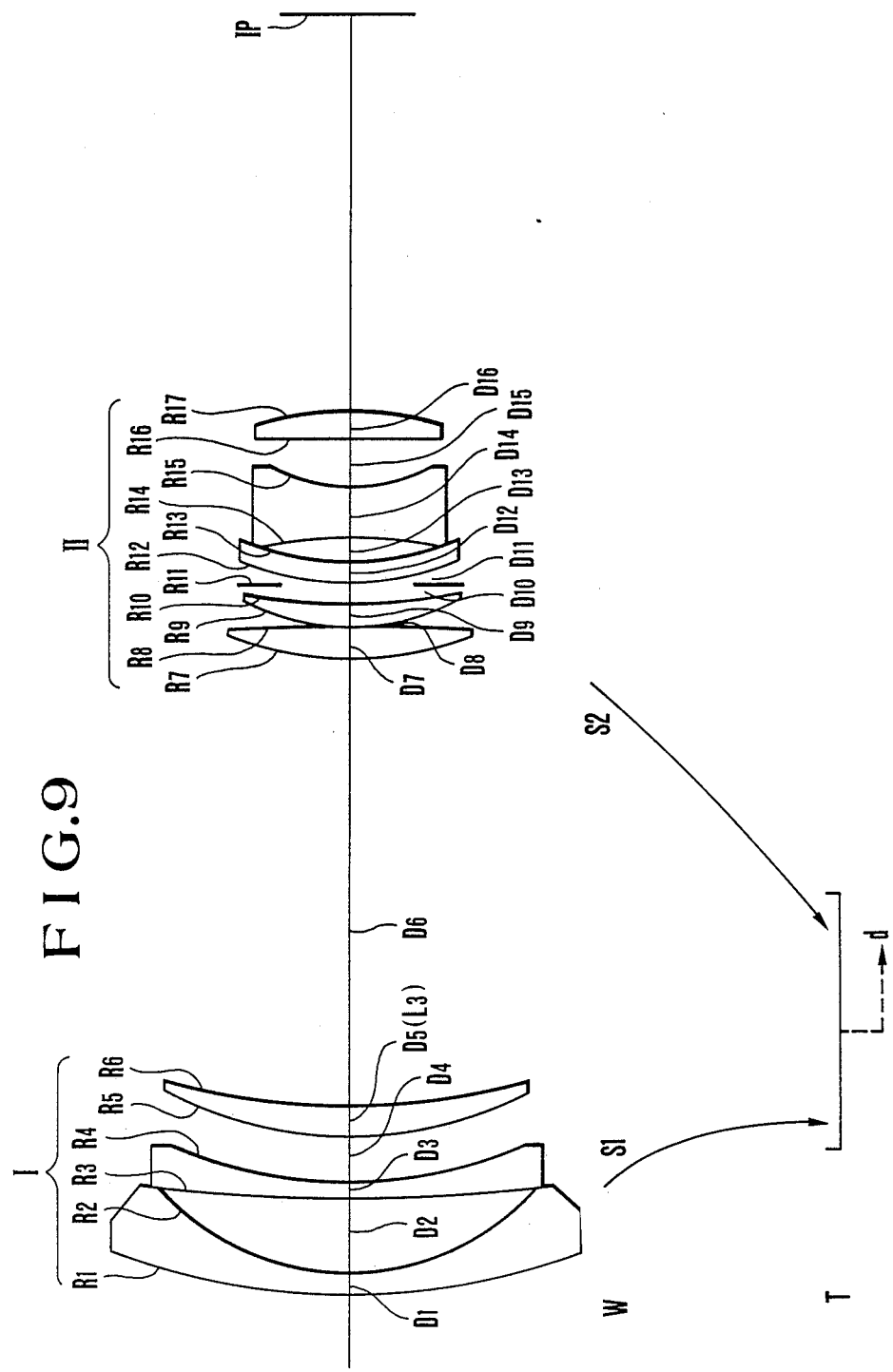

1

CAMERA HAVING TELESCOPIC CAPABILITY

BACKGROUND OF THE INVENTION

1. Field of the Invention

This invention relates to telescope-cum-cameras and, more particularly, to telescope-cum-cameras of simple structure whose telescopic capability is formed by utilizing the photographic lens and the eyepiece lens.

2. Description of the Related Art:

When one goes mountaineering or hiking, if both a camera and a telescope are on hand, the enjoyment seems to be doubled. In fact, if both are carried, it will be burdensome. So, very often, only one of them is carried. Also, even if both are brought out at great pains, the poor management due to the separation of the ability to take pictures from the ability to observe will probably result in missing a good shutter chance which is rarely encountered. Hence the user will also be inconvenienced at many events.

For these reasons, the unified form of both, or what is a so-called telescope- or binocular-cum-camera (hereinafter referred to the "telescope-cum-camera") has now already been sold in the market.

However, most of the conventional types of the telescope-cum-camera merely put the camera and the telescope or the binocular together, thus being an odd coupling. The use of such a prototype in the assembly leads both to the lack of a good manageability of the camera since its entirety is very bulky, and to limit the availability of the photographic lenses to telephoto ones.

SUMMARY OF THE INVENTION

To eliminate the above-described drawbacks of the prior art, the present invention approaches from the camera side by imparting a telescopic capability into the camera. In other words, bearing in mind that when the camera is used as the telescope, the magnification depends on the ratio of the focal length of the photographic lens as the objective lens to the focal length of the eyepiece in the finder system, the inventor has exerted his ingenuity in a novel arrangement of the photographic lens and the finder system that gets two functions, one of which works as the camera and the other as the telescope, and which are made compatible in good balance.

In application to the camera having the photographic lens to form an object image on a focusing screen to be observed through the eyepiece lens, when to use this camera as the telescope, the spacing between the image plane of the photographic lens and the eyepiece lens is altered, while the focal length of the eyepiece lens is simultaneously altered to increase the finder magnification.

BRIEF DESCRIPTION OF THE DRAWINGS

FIGS. 3(A) and 3(B) are perspective views illustrating a third embodiment of the invention.

FIGS. 4(A) and 4(B) are perspective views illustrating a fourth embodiment of the invention.

In these figures, the ones whose figure numbers are suffixed (A) show a state ready for shooting and the ones whose figure numbers are suffixed (B) show another state for use as the telescope.

Figure 8A:
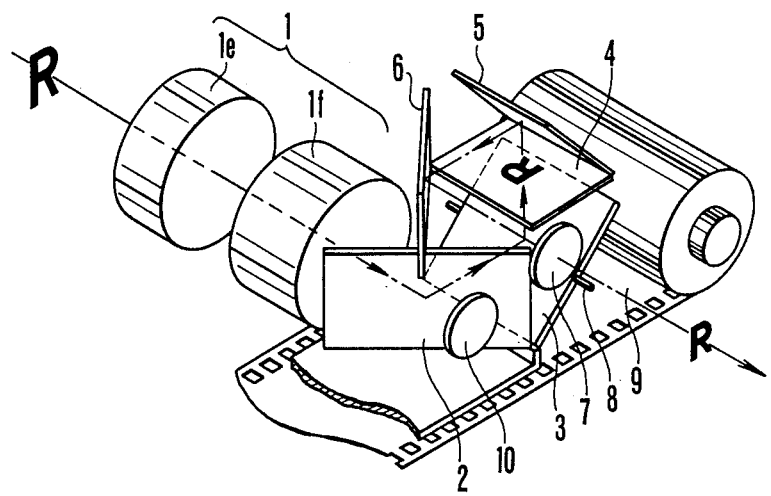
Figure 8B:
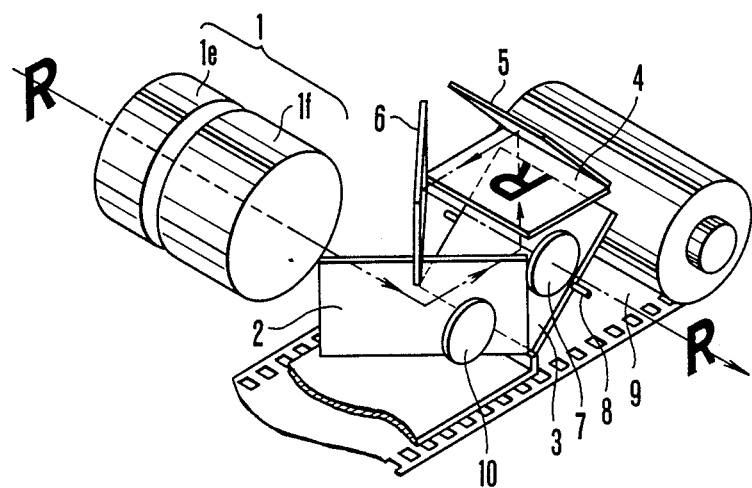
Figure 8C:
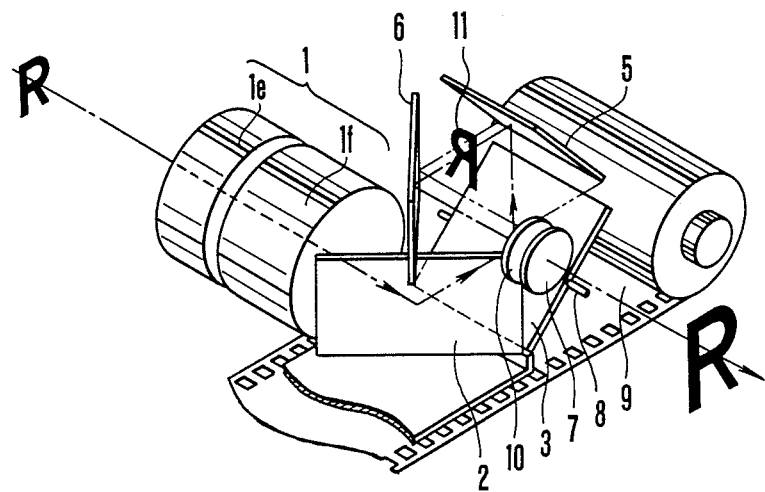

FIGS. 8(A), 8(B) and 8(C) illustrate an eighth embodiment of the invention, FIGS. 8(A) and 8(B) being perspective views when in the wide angle end and the telephoto end respectively, and FIG. 8(C) being a perspective view when in use as the telescope.

FIG. 9 is a lens block diagram of a zoom lens concerning the invention.

DETAILED DESCRIPTION OF THE PREFERRED EMBODIMENTS

Figure 1A:
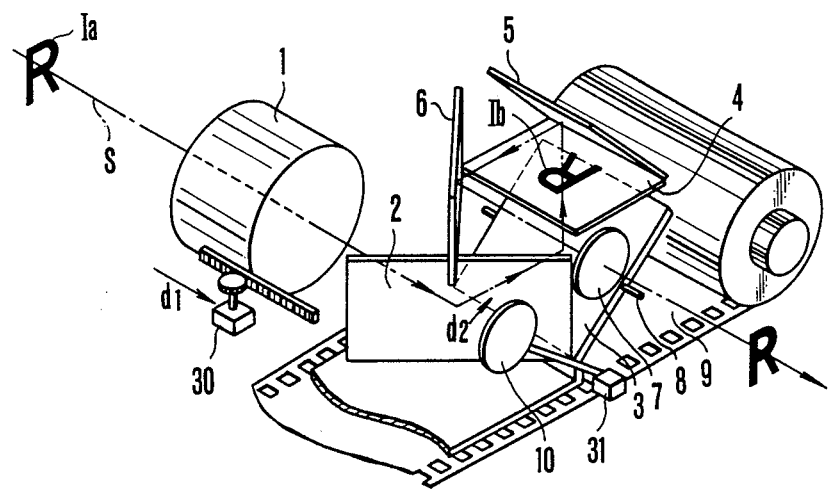
FIGS. 1(A) and 1(B) are perspective views illustrating a first embodiment of the invention.
Figure 1B:
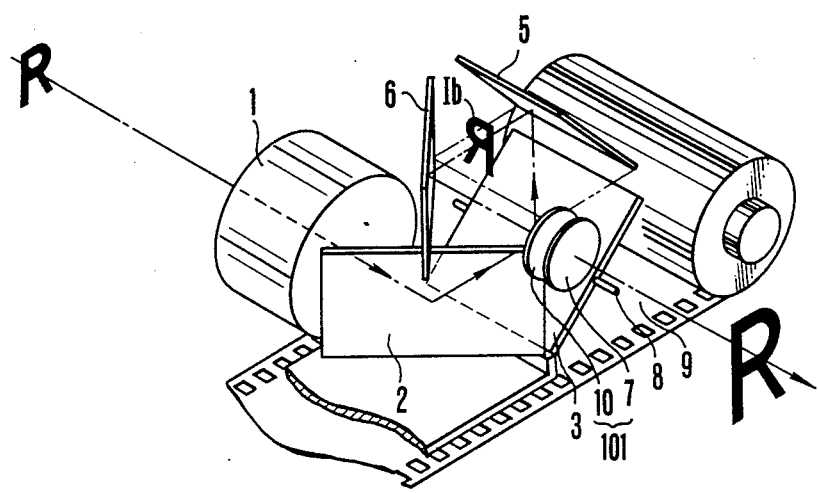

FIGS. 1(A) and 1(B) schematically show a first embodiment of the invention applied to the camera having a TTL finder. The TTL finder in a shot ready mode which operates before film is actually exposed is shown in the perspective view of FIG. 1(A). In this figure, a light beam emerging from a photographic lens 1 is reflected sideward by a first mirror 2 inclined at 45° with an optical axis S of the photographic lens 1, and then reflected upward or bent 90° by a second mirror 3, thus forming a finder image on a focusing screen 4. Light radiating from that finder image is reflected by a further or third mirror 5 in a direction perpendicular to the optical axis S and then reflected by a fourth mirror 6 in a direction parallel to the optical axis S, thus entering an eyepiece lens 7. With such a finder optical system, the finder image on the focusing screen is observed.

Prior to making an exposure, the second mirror 3 on a rotatable shaft 8 turns 90° counterclockwise as viewed from the eyepiece lens 7 so that the image-bearing light beam is conducted onto a film plane 9.

Whilst the aspect of the apparatus which functions as the camera is performed with such an arrangement, a first embodiment of the apparatus for use in a telescopic observation mode is shown in FIG. 1(B).

For now, the photographic lens 1 is moved by drive means such as an electric motor 30 from the position of FIG. 1(A) rearward as indicated by an arrow $d_1$. Thus the distance between an image Ib and the eyepiece lens 7 is shortened. In more detail, the focusing screen 4 is retracted from the optical path and the image plane of the photographic lens 1 is brought to a position nearer eyepiece lens 7.

Also, by using another drive means 31, an auxiliary lens 10 is moved in a direction indicated by arrow $d_2$ and set in front of the eyepiece lens 7. And, along with the eyepiece lens 7, it newly forms a second eyepiece lens 101 and as a whole it has a focal point at or near the finder image Ib, as the overall focal length is so determined. Thus, the photographic lens 1 and the second eyepiece lens 101 constitute a telescope. Incidentally, in FIG. 1(B), the drive means 30 and 31 shown in FIG. 1(A) are not illustrated.

Next explanation is given to the evaluation of the finder magnifications of the finder system and the telescope in the present embodiment.

Now, let us denote the focal length of the photographic lens 1 by f, the focal length of the eyepiece lens 7 by fe, the focal length of the auxiliary lens 10 by fa and the composite focal length of the eyepiece lens 7 and the auxiliary lens 10 by fea. Then the finder magnification $\beta$ of the finder system in the state of FIG. 1(A) is given by the following equation:

$$\beta = f/fe$$

Also using a constant $\alpha$ and putting $fea = fe/\alpha$, the magnification m of the telescope in FIG. 1(B) is given by the following expression:

$$m = f/fea = \alpha f/fe = \alpha \cdot \beta$$

That is, compared with the set value of the finder magnification $\beta$ when the apparatus is used as the camera, the finder magnification can be enlarged at times when it is used as the telescope.

Suppose the focal position of the photographic lens 1 is displaced by a distance of, for example, ½ of the distance from the position at which the focusing screen 4 has been arranged to the eyepiece lens 7, and the focal length fa of the auxiliary lens 10 is chosen to be a value, for example, nearly equal to the focal length of the eyepiece lens 7, then $\alpha \approx 2$. Therefore, the finder magnification when in the telescope is twice enlarged as compared with when in the form of camera. To this purpose, in the present invention, use is made of a method of moving the photographic lens 1 as a whole rearward with an advantage of preventing the lowering of quality of the finder image from lowering.

In the present embodiment, the finder magnification is enlarged by such means of simple structure to permit the camera to be used as the telescope.

In the present embodiment, because the photographic lens 1 when in use as part of the telescope is moved, if all the mirrors are left unchanged from their arrangement of actually taking a picture, no good object image would focus on the photosensitive surface 9. For this reason, in the present embodiment, when the camera is switched to the telescope, this changeover is detected by checking means (not shown) and the shutter is locked. Due to such an arrangement, the photosensitive surface 9 is protected against unintentional impinging of light thereon.

Figure 2A:
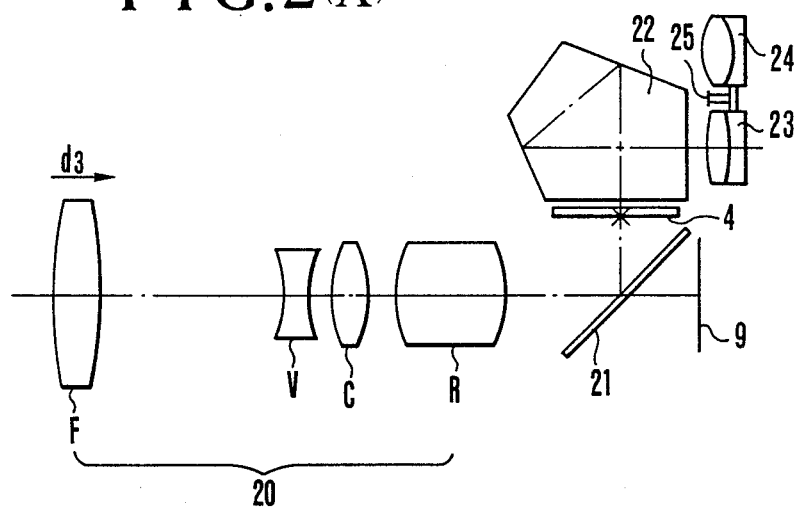
FIGS. 2(A) and 2(B) are perspective views illustrating a second embodiment of the invention.
Figure 2B:
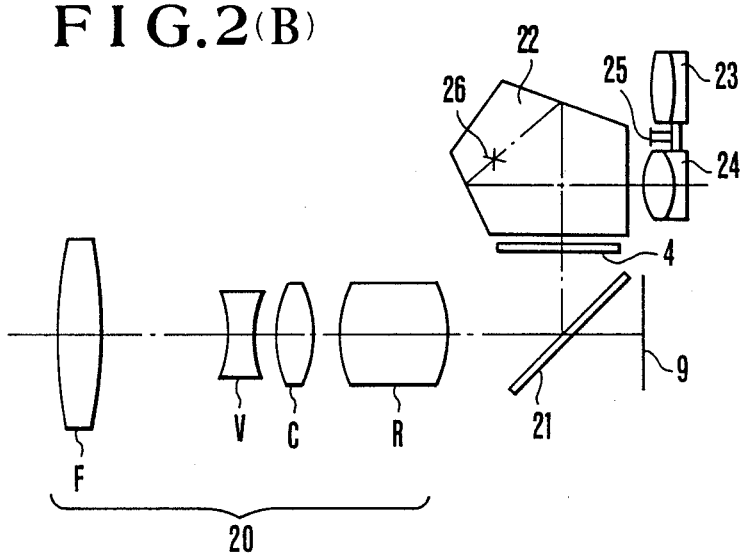

FIGS. 2(A) and 2(B) are schematic diagrams of a second embodiment of the invention. FIG. 2(A) is the invention when in use as the camera and FIG. 2(B) when in use as the telescope.

The present embodiment is applied to the case of using a zoom lens as the photographic lens.

In these figures, a reference numeral 20 denotes the zoom lens comprising a focusing lens group F, a variator lens group V for varying the image magnification, a compensator lens group C for compensating for the image shift resulting from the variation of the image magnification, and a relay lens group R for forming an image, in total four lens groups.

With the case of FIG. 2(A) for use as the camera, a light beam from the zoom lens 20 after having been reflected from a quick return mirror 21, forms a finder image on the focusing screen 4. And the finder image is observed through a pentagonal roof type prism 22 by an eyepiece lens 23.

To use it as the telescope, the magnification varying section of the zoom lens 20 is first set to the telephoto end, and then the focusing lens group F is moved by drive means such as an electric motor (not shown) toward the film plane 9 as indicated by an arrow d3 so that the focus position of the finder image is displaced to a position 26 within the pentagonal roof type prism 22. Then a second eyepiece lens 24 mounted in opposed relation to, and differentiated in focal length from, the eyepiece lens 23 is introduced into the optical path of the finder in replacement of the eyepiece lens 23 by means of a rotatable shaft 25 constituting part of the altering means. At this time, the finder diopter must be adjusted. For this purpose, the focal length of the second eyepiece lens 24 is determined to be shorter than the focal length of the eyepiece lens 23. As a result, the value the finder magnification takes when the finder is observed as the telescope is made larger than the value of the finder magnification in the state of the camera.

Of the lens groups according to the present embodiment, the focal length of the focusing lens group F is generally shorter than the longest focal length of the entire system. Therefore, the refractive power of the combined system from the variator lens group V to the relay lens group R becomes negative, and as the focusing lens group F moves rearward, the focal length of the entire system increases. Hence the zoom lens of the type used in the present embodiment is advantageous from the standpoint of increasing the finder magnification.

In the present embodiment, the use of the focusing lens group F as the lens group that is moved rearward when the telescope is formed gets a feature that some elongation of the helicoid of the focusing ring or some extension of the cam slot formed in the lens barrel suffices for the impartment of the telescopic capability.

It is to be noted that in the present embodiment if the focusing screen 4 is constructed with inclusion of a Fresnel lens or like field lens, the distance the image plane shifts as the photographic lens moves when the camera converts to the telescope is caused to shorten and the increase in the magnification also is be somewhat impeded. On this account, it is preferred to remove the focusing screen 4 out of the optical path of the finder when using the telescopic capability, for the required rearward movement of the photographic lens can be minimized.

Besides these, two or more auxiliary lenses may be used in combination with selector means for selecting an arbitrary one of them to obtain the corresponding desired one of the two or more values of the finder magnification.

In the present embodiment, the focusing method for macro photography or the rear focusing method in the art of zoom lenses may be employed. In this case, when using the telescopic capability, the focusing lens group is moved in the opposite direction to that in which it is moved to effect focusing down to shorter object distances.

For example, as the zoom lens whose front lens group is of positive power and whose rear lens group is of negative power, when the provision of the invention is made at the rear or negative lens group, it is moved forward.

Another embodiment of the invention is shown in FIGS. 3(A) and 3(B) where the length of the optical path between the eyepiece lens and the image plane is shortened by a different method, from that described above. Incidentally, the explanation of the camera in the state of taking pictures shown in FIG. 3(A) is essentially the same as with FIG. 1(A). So it is not repeated here.

In the present embodiment, as shown in FIG. 3(A), a prism 11 and an eyepiece 12 whose focal length is shorter than that of the eyepiece lens 7, which were retracted forward from the optical path of the finder, are inserted into the optical path of the finder to change over that optical path of the finder which is used when taking pictures. This constitutes a feature which is characteristic of the invention.

Here, the prism 11 has two reflection surfaces 11-1 and 11-2 arranged so that the image formed on the focusing screen 4 is conducted to the eyepiece lens 12 not through the third and fourth mirrors 5 and 6.

The magnification as observed in the form of the telescope, as has been described above, is given by the ratio of the focal lengths of the objective lens (photographic lens) and the eyepiece lens. And, in general, the finder system has the focusing screen set up at or near the focus position of the eyepiece lens. To raise the magnifying power of the telescope, therefore, the focal length of the eyepiece lens must be decreased. Also, to allow for the decrease of the focal length of the eyepiece lens, the distance between the focusing screen and the eyepiece lens must be decreased by an amount corresponding to the change of the focal length of the eyepiece.

In the example of FIG. 3(B), the distance from the focusing screen 4 to the new eyepiece lens 12 is shortened from that of FIG. 1(A). In addition, the use of the prism 11 further shortens the length of the optical path. Therefore, the required focal length for observing the finder image of the eyepiece lens can be shortened. As a result, the magnifying power of the finder rises and the telescope can be used at a higher magnification.

For example, the photographic lens 1 has a focal length of 60 mm and the length of the optical path from the focusing screen 4 past the reflection mirrors 5 and 6 to the eyepiece lens 7 is 50 mm. In this case, the focal length of the eyepiece lens 7 is required to be 50 mm. Hence the finder magnification of the camera in the state of taking pictures of FIG. 3(A) is found to be 1.2×. Next for the case of FIG. 3(B), according to the investigations, the decrease of the length of the optical path by the use of the prism 11 can be made up to, for example, about ½ at minimum as short as the distance from the entrance surface to the exit surface. Suppose the shortening of the distance is ⅓, and a glass material whose refractive index is 1.7725 is used as the medium of the prism 11, then the length of the optical path as optically measured can be shortened to 14.1 mm. Therefore, the eyepiece lens 12 also has its focal length shortened to about 14 mm. As a result, in the telescopic state of FIG. 3(B), a 4.29× magnification can be obtained, which is about 3.1 times higher than that of FIG. 3(A).

It should be noted that the reflection surfaces 11-1 and 11-2 in the present embodiment may be either total reflection surfaces or mirrored reflection surfaces by evaporation coating techniques of metal. Also, if the prism 11 and the eyepiece lens 12 are mounted in a common metallic frame so that they move as a unit, the structure becomes simple and a large advantage is gained.

The essence in this embodiment is that while keeping the condition that the finder system has its focusing screen placed at the focal point of the eyepiece lens, the construction of the finder system is altered in order to change the magnification. Since the increase of the magnification of the finder system means that a central zone for the smaller angular field of the photographic lens is in use, the aberrations of the photographic lens itself give rise to almost no problem. Because, as the angle of view of the finder in the telescope setting is far smaller than that when in the camera setting, the image whose height is around the paraxial region of the photographic lens is viewed in enlargement, it is also possible to take another form shown in FIGS. 4(A) and 4(B). FIG. 4(A) shows an arrangement of the focusing screen 4 and its neighbor parts when used as the finder of the camera. The optical path indicated by arrows represents the optical axis of the photographic lens 1. The reflections by the second mirror 2 and the third mirror 5 are the same as in FIG. 3(A). A subsequently altered arrangement for the telescope setting is shown in FIG. 4(B). During this altering process, the third mirror 5 is moved aside in a direction toward the center axis of the focusing screen 4. Thus the position in the third mirror 5 at which the paraxial light beam reflects is changed to permit the beam to be conducted by an additional reflection mirror 13 to the eyepiece lens 12.

As is apparent from these figures, even in this case, the distance from the focusing screen 4 to the eyepiece lens is shortened to assist in establishing a telescope state.

Another example of the embodiment is that a glass block is inserted into the optical path of the finder between the third mirror 5 and the fourth mirror 6 to shorten the length of the optical path up to the eyepiece lens. This is to utilize a rule of design that with the glass block having a length l and a refractive index n (n≧1.3), when inserted, the length of the optical path is changed to a shorter one by (1-1/n)l. In this case, the eyepiece lens 7 also has to be replaced by an eyepiece lens 12 of shorter focal length by a corresponding amount to that change. One advantage of this example is that the two mirrors 5 and 6 can be used in common for both purposes, namely, the camera and the telescope.

The method of adjusting the length of the optical path may take many forms. Likewise a wide variety of examples of modification of the design of the eyepiece lens can be considered. For example, from the reason that the eyepiece lens in the telescope state is shorter in focal length than the eyepiece lens in the camera state, the eyepiece lens 7 of the camera state is used in common and an additional lens is put in axial alignment therewith to achieve the shortening of the focal length. In this case, the eyepiece lens for the telescope which is retracted when in the camera state can share the required power with the eyepiece lens 7. Hence it may be formed to a lower power than that which would be required when otherwise constructed not in common but in the form of a single one as the eyepiece lens 12.

This fact means that the radius of curvature of the lens can be increased. Because the lens thickness gets thinner, an advantage on space saving is produced.

Figure 5A:
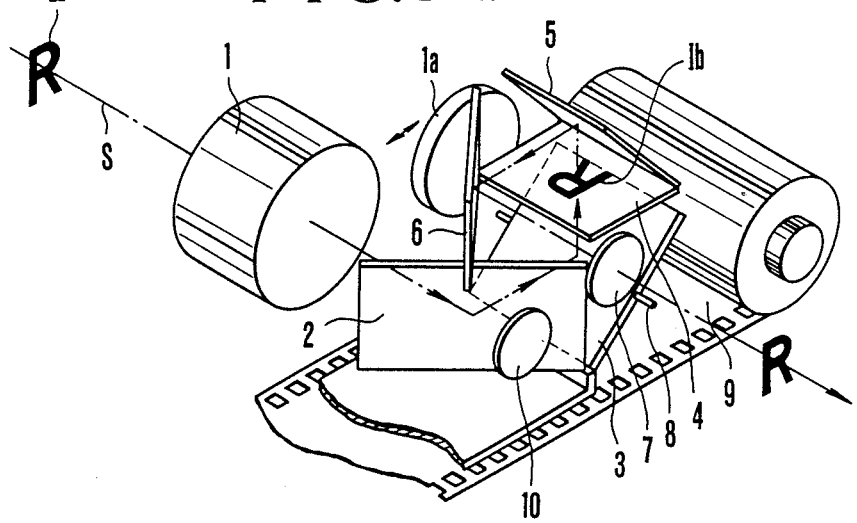
FIGS. 5(A) and 5(B) are perspective views illustrating a fifth embodiment of the invention.

Next, yet another embodiment is shown in FIG. 5(A) and those that follow. FIG. 5(A) shows the state for taking pictures of a finder system, where the parts denoted by the same reference numerals as those indicated in FIG. 1(A) and their operations are the same and therefore their explanation is omitted.

Figure 5B:
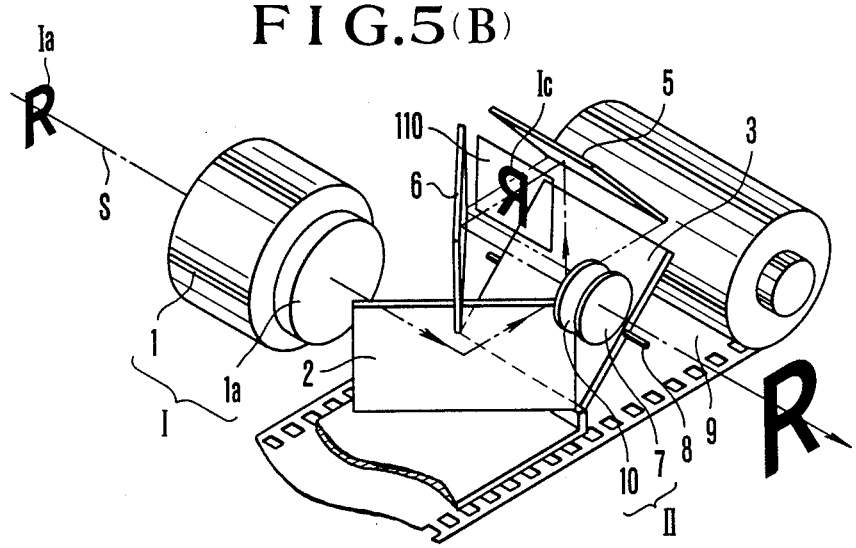

What is characteristic of this FIG. 5(A) is that when rendering the camera to function as the telescope, a first auxiliary lens 1a of negative refractive power is inserted behind the photographic lens 1 as shown in FIG. 5(B), constituting a lens system I, and at the same time a second auxiliary lens 10 of positive refractive power is inserted in front, or in rear, of the eyepiece lens 7, constituting a finder lens system II. And, the focusing screen 4 is retracted from the optical path of the finder. Incidentally, the second auxiliary lens 10 when in the as-camera state, is retracted to behind the first mirror 2.

By altering each element in such a way, first with the photographic lens 1, its focus position is displaced to a nearer position 110 to the eyepiece lens 7 at which a finder image Ic is formed. And this finder image is observed through the lens system II comprised of the second auxiliary lens 10 and the eyepiece lens 7 under the condition that the diopter is adjusted, as if the telescope is looked through.

In particular, the present invention has a feature that the refractive powers and the insert position of the first auxiliary lens 1a and the second auxiliary lens 10 are so properly determined that the focal length of the lens system I is made longer than the focal length of the photographic lens 1 and the focal length of the lens system II is made longer than the focal length of the eyepiece lens 7, whereby a telescope of high observation magnification is formed.

Incidentally, in the present embodiment, when using it as the telescope, it is preferred to remove the focusing screen 4 out of the optical path, for the magnification as the telescope can be increased.

Also, if a smaller viewfield frame or Fresnel lens than when in the case of the camera is inserted into the neighborhood of the position 110 in response to insertion of the first auxiliary lens 1a, the finder image can be observed in a better state.

Next, the concrete observation magnification, or the so-called finder magnification, of the finder system and the telescope in the present invention is explained.

Now, the focal length of the photographic lens 1 is denoted by f, the foal length of the lens system I by $f_I$, the focal length of the eyepiece lens by fe, the focal length of the second auxiliary lens 10 by fa and the focal length of the composite lens system II of the eyepiece lens 7 and the second auxiliary lens 10 by $f_{II}$. The finder magnification 8 of the finder system of FIG. 5(A) becomes $$\beta = f/fe$$

Also, using constants of $\alpha$ and $\alpha e$, and putting $f_I = \alpha \cdot f$, and $f_{II} = fe/\alpha e$, the magnification m of the telescope is given by the following equation:

$$m = f_I/f_{II} = \alpha \cdot \alpha e \cdot f/fe = \alpha \cdot \alpha e \cdot \beta$$

Now, since $\alpha > 1$, $\alpha e > 1$, as compared with the finder magnification $\beta$ of the case of using it as the camera, the case of using it as the telescope can $\alpha \cdot \alpha e$ times enlarge the finder magnification m.

For example, in FIG. 5(B), by a distance of ½ of the distance from the position at which the focusing screen 4 was arranged to the eyepiece lens 7, the focus position is displaced when the focal length of the photographic lens 1 is changed by using the first auxiliary lens 1a and at this time the focal length fa of the second auxiliary lens 10 is chosen to have an almost equal value to the focal length of the eyepiece lens 7. Then, $\alpha e \approx 2$ is the result. Further $\alpha > 1$, the finder magnification m is more than 2 times enlarged when in the telescope than when in the case of the state of the camera.

In the present embodiment, by such a simple form, the finder magnification is enlarged to make it possible to use as the telescope.

In the present embodiment, when it is used as the telescope, the focus position of the photographic lens 1 is moved. Therefore, no good object image is formed on the photosensitive surface. For this reason, an arrangement is made such that when in the state of using it as the telescope, this state is detected by, for example, recognizing means (not shown) to effect locking of the shutter so that the light beam does not enter the photosensitive surface.

In the embodiment of FIGS. 5(A) and 5(B), instead of the auxiliary lens 1a having the negative refractive power, a parallel flat glass block may be inserted as the auxiliary optical member. Even in this case, the focus position can be moved by $\alpha(1-1/n)$ from the original position to the eyepiece lens. In cooperation with the changeover of the eyepiece lens, therefore, the finder magnification may otherwise be raised.

FIGS. 6(A) and 6(B) and FIGS. 7(A) and 7(B) are schematic diagrams of part of another embodiment of the invention.

Figure 6A:
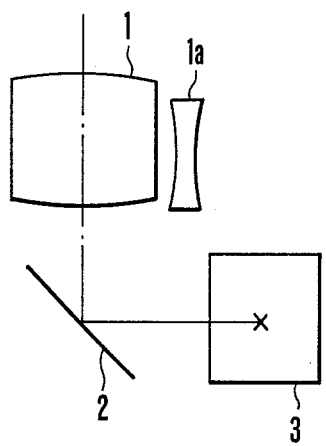
FIGS. 6(A) and 6(B) are perspective views illustrating a sixth embodiment of the invention.
Figure 6B:
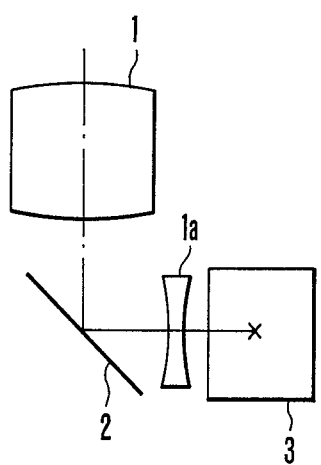
Figure 7A:
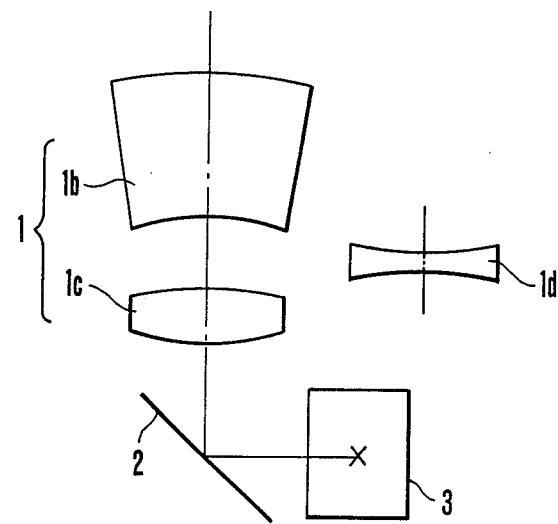
FIGS. 7(A) and 7(B) are perspective views illustrating a seventh embodiment of the invention.
Figure 7B:
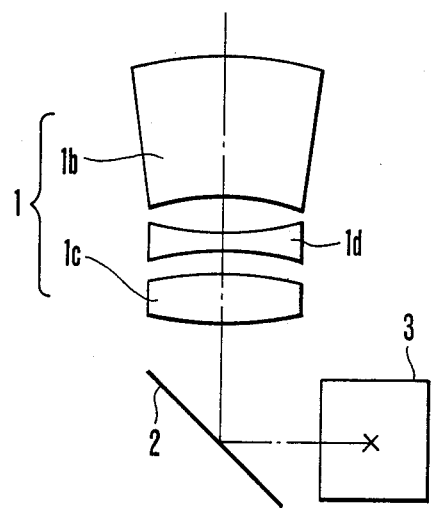

In an example of the embodiment of FIGS. 6(A) and 6(B), an auxiliary lens 1a of negative refractive power is arranged between the first mirror 2 and the second mirror 3. In another example of the embodiment of FIGS. 7(A) and 7(B), an auxiliary lens 1d of negative or positive refractive power is inserted into a space between a front lens 1b and a rear lens 1c forming a photographic lens 1 so that the focal length of the photographic lens 1 in either case is changed to be longer so as to displace the focus position toward the eyepiece lens (not shown).

Next, a further embodiment of the invention is described. The embodiment disclosed here is that in the case that the photographic lens is a zoom lens, a minimization of the size is achieved, while still permitting the camera to be managed as the telescope more effectively.

FIGS. 8(A), 8(B) and 8(C) show the embodiment of the invention but the operation and function of the parts denoted by the reference numerals 2 to 10 are similar to those in the above-described embodiment and therefore not be explained again.

In the present embodiment, the photographic lens 1 is constructed with a negative lens group 1e having a negative refractive power and a positive lens group 1f having a positive refractive power in this order from the object side. They are arranged such that when zooming from the wide angle side to the telephoto side (from the position of FIG. 8(A) to the position of FIG. 8(B)), at least the positive lens group 1f is moved to the object side. In other words, a zoom lens system is employed that when zooming from the wide angle side to the telephoto side, the last lens group of the zoom lens is moved to the object side so that at the telephoto end, a space is created behind the last lens group. Incidentally, the lens groups 1e and 1f each consist of a plurality of lenses.

FIGS. 8(A) and 8(B) in perspective views show the apparatus treated as the camera, that is, when used in taking pictures. Next, the perspective view of the apparatus treated as the telescope is shown in FIG. 8(C). In the mode here, from the zoom lens state at the telephoto end, that is, the state where the space is created behind the last lens group, the zoom lens 1 is moved as a whole rearward so that a predetermined image moves near to the eyepiece lens, while the auxiliary lens 10 is inserted into the front of the eyepiece lens 7 to strengthen the refractive power of the eyepiece lens system as a whole.

In FIG. 9, there is shown a lens block diagram of a specific 2-group zoom lens shown in FIGS. 8(A), (B) and 8(C). A reference character I (1e) denotes a first lens group having a negative refractive power, and another reference character II (1f) denotes a second lens group having a positive refractive power. When zooming from the wide angle side to the telephoto side, they move according to respective loci of motion indicted by arrows S₁ and S₂.

In the case of forming an observation system as the telescope, from the state where the zoom lens is at the telephoto end, the lens groups I and II are moved in unison to the rear as shown by an arrow d.

Next, for reference, the numerical data of the zoom lens shown in FIG. 9 are shown below. In the numerical example, Ri is the radius of curvature of the i-th lens surface counting from the object side, Di the i-th lens thickness or air separation counting from the object side, and Ni and νi the refractive index and Abbe number of the glass of the i-th lens counting from the object side.

Numerical Example
F = 36–67.5  FNO = 1:4

| | | | |
|---|---|---|---|
| R 1 = 67.81 | D 1 = 1.90 | N 1 = 1.77250 | ν 1 = 49.6 |
| R 2 = 25.98 | D 2 = 7.81 | | |
| R 3 = 188.33 | D 3 = 1.70 | N 2 = 1.77250 | ν 2 = 49.6 |
| R 4 = 49.35 | D 4 = 4.69 | | |
| R 5 = 37.81 | D 5 = 3.30 | N 3 = 1.75520 | ν 3 = 27.5 |
| R 6 = 83.50 | D 6 = Variable | | |
| R 7 = 39.66 | D 7 = 3.13 | N 4 = 1.69680 | ν 4 = 55.5 |
| R 8 = −226.90 | D 8 = 0.10 | | |
| R 9 = 26.77 | D 9 = 2.47 | N 5 = 1.64000 | ν5 = 60.1 |
| R10 = 118.54 | D10 = 1.70 | | |
| R11 = Stop | D11 = 0.20 | | |
| R12 = 28.08 | D12 = 2.20 | N 6 = 1.60311 | ν 6 = 60.7 |
| R13 = 31.43 | D13 = 1.90 | | |
| R14 = −118.62 | D14 = 5.44 | N 7 = 1.80518 | ν 7 = 25.4 |
| R15 = 19.16 | D15 = 4.34 | | |
| R16 = 186.41 | D16 = 2.79 | N 8 = 1.62588 | ν = 35.7 |
| R17 = −31.51 | | | | f   36.0         67.5
D6  30.18        0.11
f1 = −58.04   f2 = 39.97

As has been described above, in the invention, by using the space of the finder of the camera, it is made possible to impart a full-scale telescopic capability into the camera. The first of advantages of the invention is the compactness. The optical elements constituting the finder are not so much large in any sense. As is understandable at a glance of, for example, FIG. 1(B), the auxiliary lens to be inserted itself is small. Therefore, addition of the telescopic capability to the camera is achieved in a very compact form.

The second advantage is that the number of common parts between the camera state and the telescope state is so large that the system is easily realized and operates stably and a side effect of low cost is produced.

A very small number of additional parts suffice for converting the conventional camera to a camera of the invention. Further, these parts are compact. Therefore, the cost performance owing to the addition of these parts can be said to be very large.

The third advantage arising from the use of the photographic lens in the objective lens of the telescope is that the image quality in the telescope is excellent. Particularly in the embodiments shown in FIGS. 1(A), 1(B), 2(A) and 2(B), because of using that central zone of the photographic lens which is corrected for an especially good image, the aberrational problem hardly becomes serious.

The fourth advantage is that if combined with zoom lenses or interchangeable lenses, the capability of varying the image magnification can be more enjoyed than with the conventional telescope.

According to the embodiments of the invention, the telescopic capability can be imparted very advantageously with the limitation of the size of the camera to a minimum.

What is claimed is:

1. A camera having a first mode and a second mode, comprising:
   objective lens means;
   eyepiece lens means for observing an image concerning light of said objective lens means;
   focal length altering means for changing a focal length of said eyepiece lens means and distance from the image to said eyepiece lens means to shift from said first mode to said second mode.

2. A camera according to claim 1, wherein said first mode is an observation mode for photography preparation and said second mode is an observation mode for a telescope.

3. A camera according to claim 1 or 2, wherein to shift from said first mode to said second mode, said focal length altering means, while moving said objective lens means rearward along an optical axis, shortens the focal length of said eyepiece lens means.

4. A camera according to claim 1 or 2, wherein when shifting from said first mode to said second mode, said focal length altering means, while changing the focal length of said objective lens means to bring the image closer toward said eyepiece lens means, changes the focal length of said eyepiece lens means.

5. A camera according to claim 4, wherein said focal length altering means changes the image position by inserting an auxiliary lens having a negative refractive power to the image side of said objective lens means.

6. A camera according to claim 1 or 2, wherein to shift from said first mode to said second mode, said focal length altering means arranges an optical member between the image of said objective lens means and said eyepiece lens means to shorten an optical path and shortens the focal length of said eyepiece lens means.

7. A camera according to claim 1 or 2, wherein said objective lens means is a zoom lens.

8. A camera according to claim 7, wherein when zooming from the wide angle side to the telephoto side, the last lens group of said zoom lens moves to the object side.

9. A camera according to claim 8, wherein shifting from said first mode to said second mode, said focal length altering means moves said zoom lens of telephoto setting rearward and shortens the focal length of said eyepiece lens means.

* * * * *

UNITED STATES PATENT AND TRADEMARK OFFICE
CERTIFICATE OF CORRECTION

PATENT NO. : 4,949,107
DATED : August 14, 1990
INVENTOR(S) : Nozomu Kitagishi, et al.

It is certified that error appears in the above-identified patent and that said Letters Patent is hereby corrected as shown below:

COLUMN 3:

Line 14, "enlarged at times" should read --enlarged α times--.

Line 26, "of" (second occurrence) should read --of the--.

COLUMN 7:

Line 35, "magnification 8" should read --magnification β--.

COLUMN 8:

Line 65, "FIGS. 8(A), (B)" should read --FIGS. 8(A), 8(B)--.

COLUMN 9:

Line 42, "the" (first occurrence) should read --its--.

Signed and Sealed this

Ninth Day of March, 1993

*Attest:*

STEPHEN G. KUNIN

*Attesting Officer*   *Acting Commissioner of Patents and Trademarks*